United States Patent
Liu et al.

(10) Patent No.: US 11,205,256 B2
(45) Date of Patent: Dec. 21, 2021

(54) IMAGE TRANSFORMATION BY FUSION

(71) Applicant: Microsoft Technology Licensing, LLC, Redmond, WA (US)

(72) Inventors: Chengcheng Liu, Redmond, WA (US); Peng Chen, Redmond, WA (US); Shuo Wang, Redmond, WA (US); Ting Sun, Redmond, WA (US); Yuwei Cao, Redmond, WA (US); Yueyang Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/766,129

(22) PCT Filed: Dec. 13, 2018

(86) PCT No.: PCT/US2018/065315
§ 371 (c)(1),
(2) Date: May 21, 2020

(87) PCT Pub. No.: WO2019/133266
PCT Pub. Date: Jul. 4, 2019

(65) Prior Publication Data
US 2020/0364838 A1     Nov. 19, 2020

(30) Foreign Application Priority Data
Dec. 29, 2017   (CN) .......................... 201711479285.1

(51) Int. Cl.
*G06T 5/50*     (2006.01)
*G06F 16/901*   (2019.01)
*G06T 11/00*    (2006.01)

(52) U.S. Cl.
CPC ............ *G06T 5/50* (2013.01); *G06F 16/9024* (2019.01); *G06T 11/001* (2013.01); *G06T 2207/20221* (2013.01); *G06T 2207/30201* (2013.01)

(58) Field of Classification Search
CPC ..................... G06T 5/50; G06T 11/001; G06T 2207/20221; G06T 2207/30201; G06T 11/60; G06F 16/9024
See application file for complete search history.

(56) References Cited

U.S. PATENT DOCUMENTS 9,576,351 B1     2/2017  Barzel et al.
10,599,914 B2 *  3/2020  Li ...................... G06K 9/00281
(Continued)

OTHER PUBLICATIONS

Champandard et al., "Semantic Style Transfer and Turning Two-Bit Doodles into Fine Artwork", In Proceedings of the Computing Research Repository, Mar. 5, 2016, 7 Pages.
(Continued)

*Primary Examiner* — Phuoc Tran
(74) *Attorney, Agent, or Firm* — Schwegman Lundberg & Woessner, P.A.

(57) ABSTRACT

The present disclosure provides a technical solution related to processing images in image transformation by fusion. More particularly, an image of an object of an original picture may be transferred onto an image of a corresponding object in a template picture by fusion. During the transformation by fusion, the processing of fusion may be done on each pixel by using a pixel weight graph, so that the image of the object in the original picture may be better integrated into the template picture with the features of the object in the original picture maintained well in the picture processed by fusion.

18 Claims, 15 Drawing Sheets

(56) References Cited

U.S. PATENT DOCUMENTS 10,846,838 B2\* 11/2020 Hayasaka ............... G06T 11/60
2009/0220149 A1\* 9/2009 Menadeva ............. G11B 27/28
382/165

OTHER PUBLICATIONS

"International Search Report and Written Opinion Issued in PCT Application No. PCT/US18/065315", dated Apr. 9, 2019, 12 Pages.
Yang, et al., "Semantic Portrait Color Transfer with Internet Images", In Multimedia Tools and Applications, vol. 76, Issue 1, Nov. 13, 2015, pp. 523-541.

\* cited by examiner

IMAGE TRANSFORMATION BY FUSION

CROSS-REFERENCE TO RELATED APPLICATION

This application is a U.S. National Stage Filing under 35 U.S.C. 371 of International Patent Application Serial No. PCT/US2018/065315, filed Dec. 13, 2018, and published as WO 2019/133266 on Jul. 4, 2019, which claims priority to Chinese Application No. 201711479285.1, filed Dec. 29, 2017, which applications and publication are incorporated herein by reference in their entirety.

BACKGROUND

As being applied and being popular of some APPs (application programs) for processing images, more and more users now may have fun in some simple image processing software, e.g., by adding some fancy patterns in a captured photograph, or embedding an image of himself or herself into some scenario so as to bring various style to the images of himself/herself. Some users may hope to integrate images of himself/herself into other images so as to change the images of himself/herself with a premise that the character features of himself/herself are retained.

BRIEF SUMMARY

The embodiments of the present disclosure are provided to give a brief introduction to some concepts, which would be further explained in the following description. This Summary is not intended to identify essential technical features or important features of the subject as claimed nor to limit the scope of the subject as claimed.

A technical solution related to a technique for processing images in image transformation by fusion. More particularly, an image of an object of an original picture may be integrated into an image of a corresponding object in a template picture by fusion. During the transformation by fusion, the processing of fusion may be done on each pixel by using a pixel weight graph, so that the image of the object in the original picture may be better integrated into the template picture with the features of the object in the original picture maintained well in the picture processed by fusion.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

Figure 1:
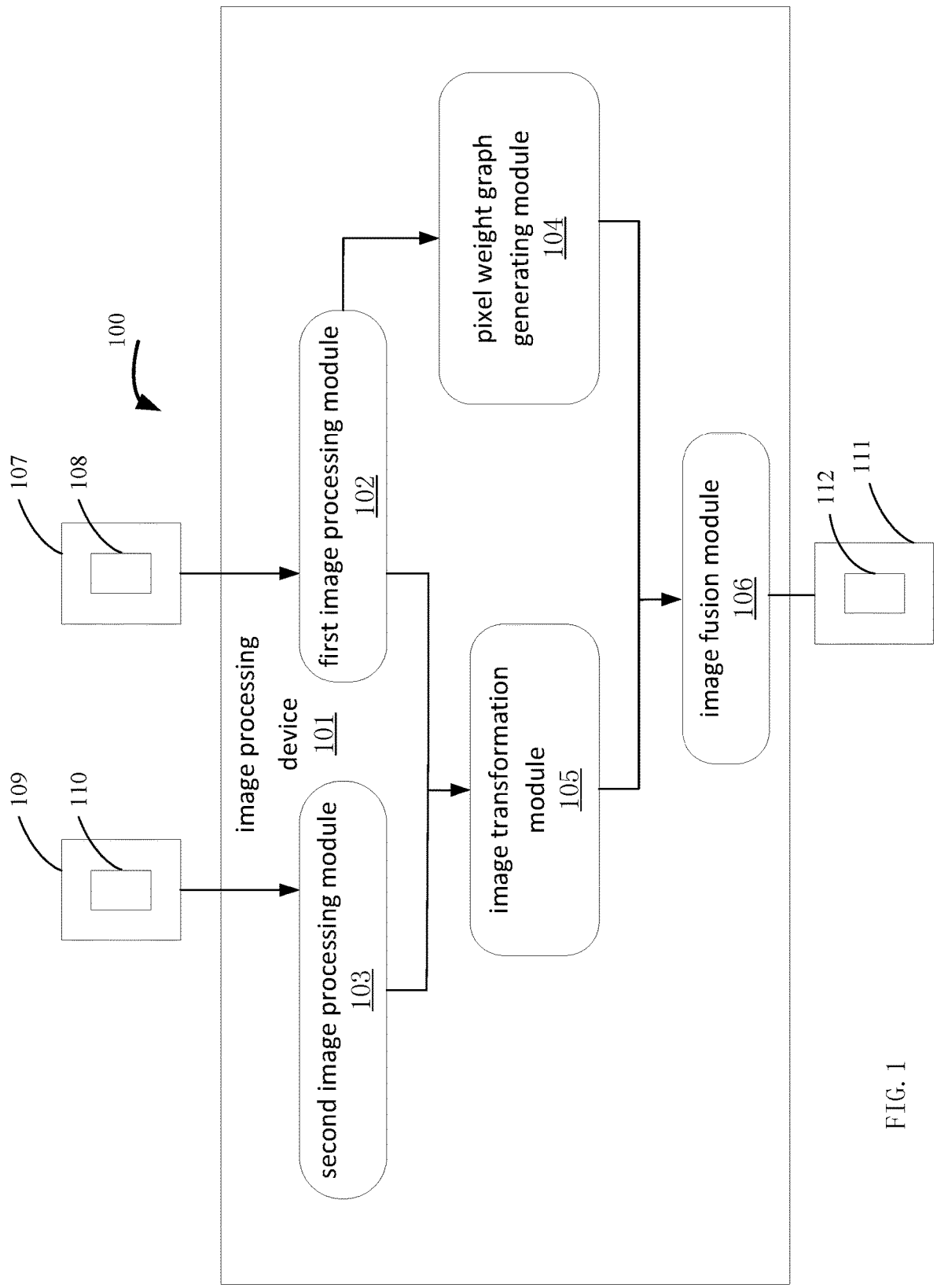
FIG. 1 is an exemplary block diagram of an image processing device of embodiments of the present disclosure.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, systems, and computer program products related to recommendation in using of mobile devices.

The term "technique", as cited herein, for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

Embodiments of the present disclosure may be mostly applied in the following scenario: a user may provide an original picture and select a template picture. With the image processing performed by an image processing device provided by embodiments of the present disclosure, an image of an object in the original picture may be transformed to an image of an object corresponding thereto in the template picture by fusion, so that the image of the object in the original picture may be better integrated into the template picture with the features of the object in the original picture maintained well in the picture processed by fusion.

In some common cases, the object in an original picture may be an object same as an object in a template picture. For example, an original picture provided by a user may be a photo of the user, a template picture may be an image of a cartoon character. The user may integrate the human face in the original picture onto the face of the cartoon character in the template picture by fusion, so that the user may see a picture of cartoon character with both cartoon style of the template picture and features of the user's face.

The above original picture and template picture may be any arbitrary two pictures without limitations on picture itself. That is to say, the template picture and the original picture described above may be exchanged with each other and the image of an object in the template picture may be transformed to an image of an object corresponding thereto of the original picture by fusion. Therefore, in order to better illustrate the technical solutions of embodiments of the present disclosure, in the following, the original picture described above may be referred as the first picture, the template picture described above may be referred as the second picture. Accordingly, an object and an image thereof in the first picture may be referred as a first object and a first object image, and an object and an image thereof in the second picture may be referred as a second object and a second object image.

As shown in FIG. 1, which is an exemplary block diagram 100 of an image processing device of embodiments of the present disclosure, the image processing device 101 may be implemented as or provided in a small portable (or mobile) electronic device, such as cell phone, personal digital assistant (PDA), personal media player device, wireless network player device, personal headset device, IoT (internet of things) intelligent device, dedicate device or combined device containing any of functions described above. The image processing device 101 may be also implemented or provided in a personal computer including configurations of laptop computer and non-laptop computer. Furthermore, the image processing device 101 may be further implemented as a server on internet or provided in a server on internet. Such server may be implemented in one or more computer systems (distributed server), or implemented as a server based on cloud technology.

The image processing device 101 may include: a first image processing module 102, a second image processing module 103, a pixel weight graph generating module 104, an image transformation module 105, and an image fusion module 106. The image processing device 101 may be configured to transform a first object image 108 in an input first picture 107 into a second object image 110 in a second picture 109 by fusion, so that a second picture 111 may be generated. In the third picture 111, a part of the second object image 110 may be turned into a third object image 112 integrating the first object image 108 and the second object image 110 by fusion, with other parts of the second object image 110 remain same as those of the second picture 109.

The first image processing module 102 and the second image processing module 103 may be configured to perform a pretreatment on the input first picture 107 and the input second picture 109, respectively. The pretreatment as cited herein may include, but not limited by: capturing an object image in a picture; marking feature points/landmarks in the picture; generating an encompassing box to obtain a boundary or outline of some picture; extracting a partial image in a picture; correcting a picture; eliminating shade in a picture; and the like.

The pixel weight graph generating module 104 may be configured to perform a processing on an input picture according to a preset rule for generating pixel weights, so as to generate a pixel weight graph showing the weight of each pixel in the picture. The pixel weight graph may be in a form of grey-scale map, in which the higher the gray-value of a pixel is, the corresponding weight of the pixel is higher, and vice versa. In embodiments of the present disclosure, the importance of feature points in a picture may be seen from the pixel weight graph, and a value of weight of the pixel corresponding to a feature point may be higher than the values of weight of other pixels corresponding to the points other than the feature point.

The image transformation module 105 may be configured to perform processing such as image style transfer, color transformation, affine transformation, outlines adjustment transformation, on another image with one image as reference.

The image fusion module 106 may be configured to perform an image fusion processing on two input pictures. More particularly, during the image fusion processing, it is necessary to perform the image fusion processing on these two pictures according to the weight of each pixel generated by the pixel weight graph generating module 104.

Figure 2:
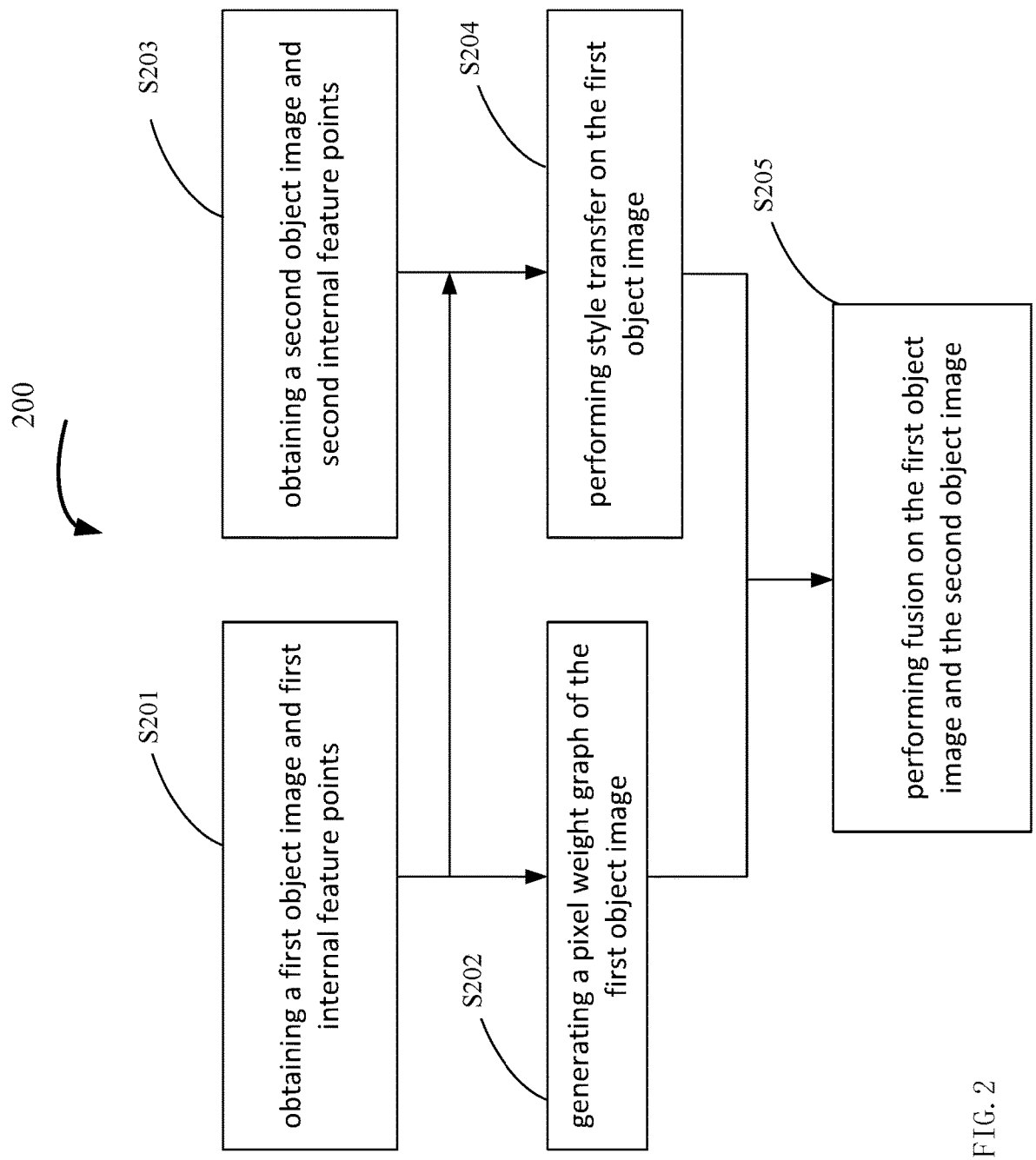
FIG. 2 is a schematic flowchart showing a processing procedure of an image processing method of embodiments of the present disclosure.

Description would be made on the image processing performed by the image processing device 101 in the following. As shown in FIG. 2, which is a schematic flowchart 200 showing a processing procedure of an image processing method of embodiments of the present disclosure, the image processing may include the following steps.

S201, obtaining a first object image and one or more first internal feature points of the first object image in a first picture. This step may be performed by a first image processing module 102.

In the above step of S201, the first internal feature points as described above may be used to mark points of main features of the first object image. With an image of human face as an example, the internal feature points thereof may be feature points representing the facial features of human face. For example, tens of or hundreds of feature points may be used to represent main features of eyes of a human face, and the distribution of these feature points may show the shape and size of the eyes, and the property value of each pixel corresponding to each of these feature points, which may be the general name of the values or parameters representing features of each pixel, such as the parameter of colors, value of brightness, grey values of a pixel, may represent one or more features of the color of eyes, texture of skin, and glossiness. With the determined first internal feature points, the main features of the first object image may be obtained. The first internal feature points may identify a specified feature part (e.g. a facial feature) based on an image identification technique and mark the main feature points.

In the above step of S201, the obtaining the first object image may be done by first identifying boundary feature points of the first object image and then performing fitting according to these boundary feature points to obtain a bounding box.

S202, generating a pixel weight graph of the first object image. This step may be performed by the pixel weight graph generating module 104.

After the boundary of the first object image and the first internal feature points of the first object image are determined, the weight of each pixel in the first object image may be calculated, so as to generate a pixel weight graph. In order to emphasize features of the first internal feature points in the subsequent image fusion processing, in the pixel weight graph, the weights of the first internal feature points may be higher than the weights of the points other than the first internal feature points. More particularly, in the above step of S202, the weights of pixels may be calculated according to a preset pixel weight generating rules: e.g., generating a pixel weight graph of the first object image according to the first internal feature points and a boundary of the first object image, wherein in the pixel weight graph, the value of the weights of the pixels of the first object image may be in a distribution in which the values of the weights decrease from the first internal feature points to the boundary. That is to say, the peak of the values of the weights of the pixels would be at each first internal feature points and the values of the weights of the pixels would decrease therefrom to the boundary of the first object image.

S203, obtaining a second object image in the second picture and one or more second internal feature points of the second object image. This step may be performed by the second image processing module 103. The detailed procedure of the processing and technical principle for obtaining the second object image in the second picture and one or more second internal feature points of the second object image may be similar with the processing for obtaining the first object image and the first internal feature points, and may refer to the corresponding description on the step of S201. Therefore, detailed description thereof may be omitted to avoid redundancy. It should be noted that, there is no relationship and/or limitation of the orders of the above step S203 and the steps of S201 and S202.

S204, performing style transfer on the first object image with the second object image as a style reference template. This step may be performed by the image transformation module 105. More particularly, the style transfer on image may be done by a machine learning module such as deep neural networks (DNN). The first object image subjected to the style transfer may have the style of the second object image.

S205, performing fusion on the first object image subjected to style transfer and the second object image in the second picture according to the pixel weight graph of the first object image to generate a third picture. In the third picture, a part of the previous second object image may be transformed into a third object image obtained upon the first object image and the second object image are subjected to image fusion, and the third object image subjected to image fusion may have the style of the second picture, while the other parts of the third picture may maintain the state of the original second picture. This step may be performed by the image fusion module 106.

During the processing of image fusion, fusion may be performed on each pixel of the first object image and the second object image according to the weight corresponding to each point in the pixel weight graph, so that in each pixel of the image subjected to image fusion, the higher the weight of the pixel is, the closer the property value of the pixel of the image subjected to image fusion is to the property value of the pixel of the first object image subjected to the style transfer, and the lower the weight of the pixel is, the closer the property value of the pixel of the image subjected to image fusion is to the property value of the pixel of the second object image.

With such processing of image fusion, the part of the image near the first internal feature points may exhibit the major features of the first object image more, while the part of the image far away from the first internal feature points may exhibit the major features of the second object image more. Such exhibitions of major features of the first object image and the second object image may change against each other as their distances to the first internal feature points change, so that the first object image and the second object image may be integrated with each other naturally by fusion.

In the above first picture and the second picture, it may be preferable for the first object and the second object to be of the same kind, since objects of same kinds may generally have feature points matched with each other, so that such objects may be better integrated with each other by fusion during the image processing. For better implementation of the present disclosure, one or more internal feature points of the first object image may be preferably matched with one or more internal feature points of the second object image in positions. The matching in positions as cited herein may refer to a position matching with respect to features of one object. For example, one object is a human face and the first internal feature points of the first object image may be the facial parts. Therefore, the second internal feature points of the second object image should be the facial parts.

Figure 3:
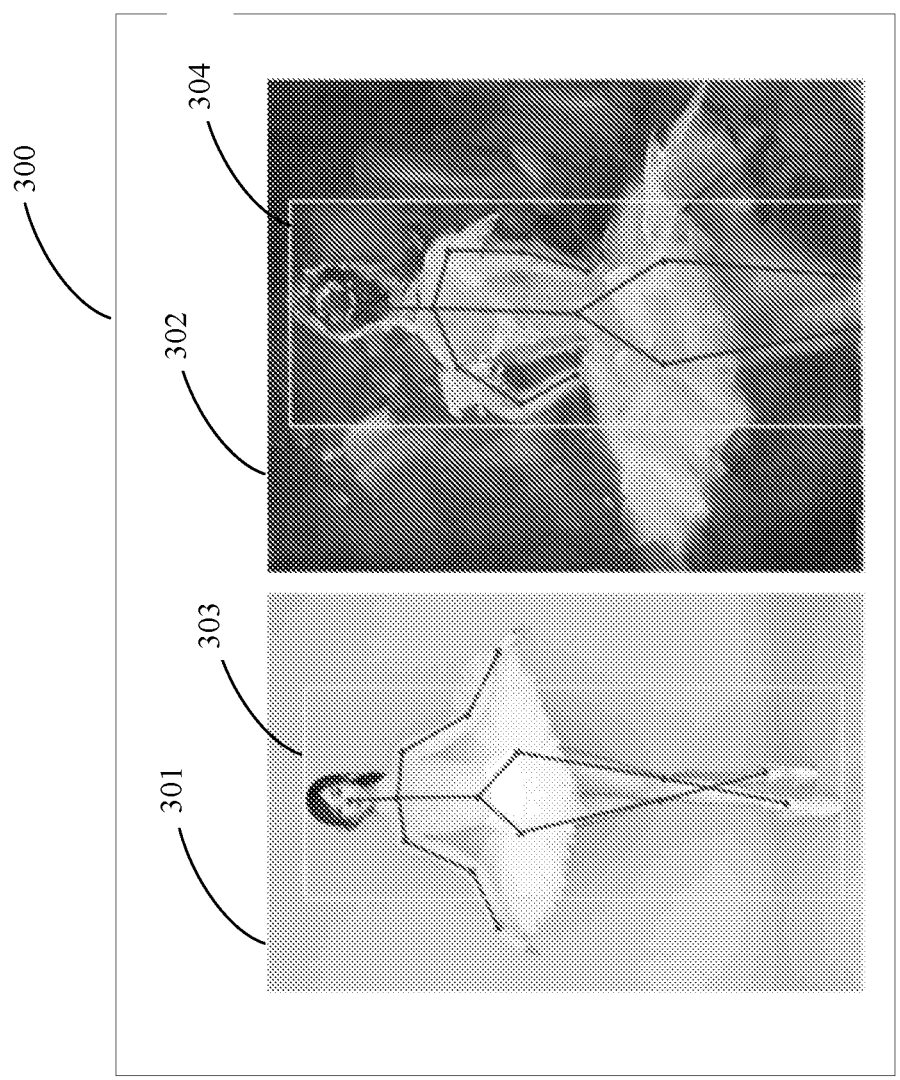
FIG. 3 is a block diagram of an exemplary picture for image processing of embodiments of the present disclosure.

In the block diagram 300 of an exemplary image for image processing of embodiments of the present disclosure as shown in FIG. 3, a picture 301 on the left may correspond to the first picture as described above and may be a photo of portrait, and the picture 302 on the right may correspond to the second picture as described above and may be an image of oil painting. More particularly, a female dancer image 303 in the picture 301 may correspond to the first object image, and a female dancer image 304 in the picture 302 may correspond to the second object image. It can be seen from the block diagram 300 that, the feature points selected from the female dancer image 303 may approximately match with the feature points selected from the female dancer image 304 in positions, and the selected feature points may be the key parts representing human's physical structure.

Figure 4:
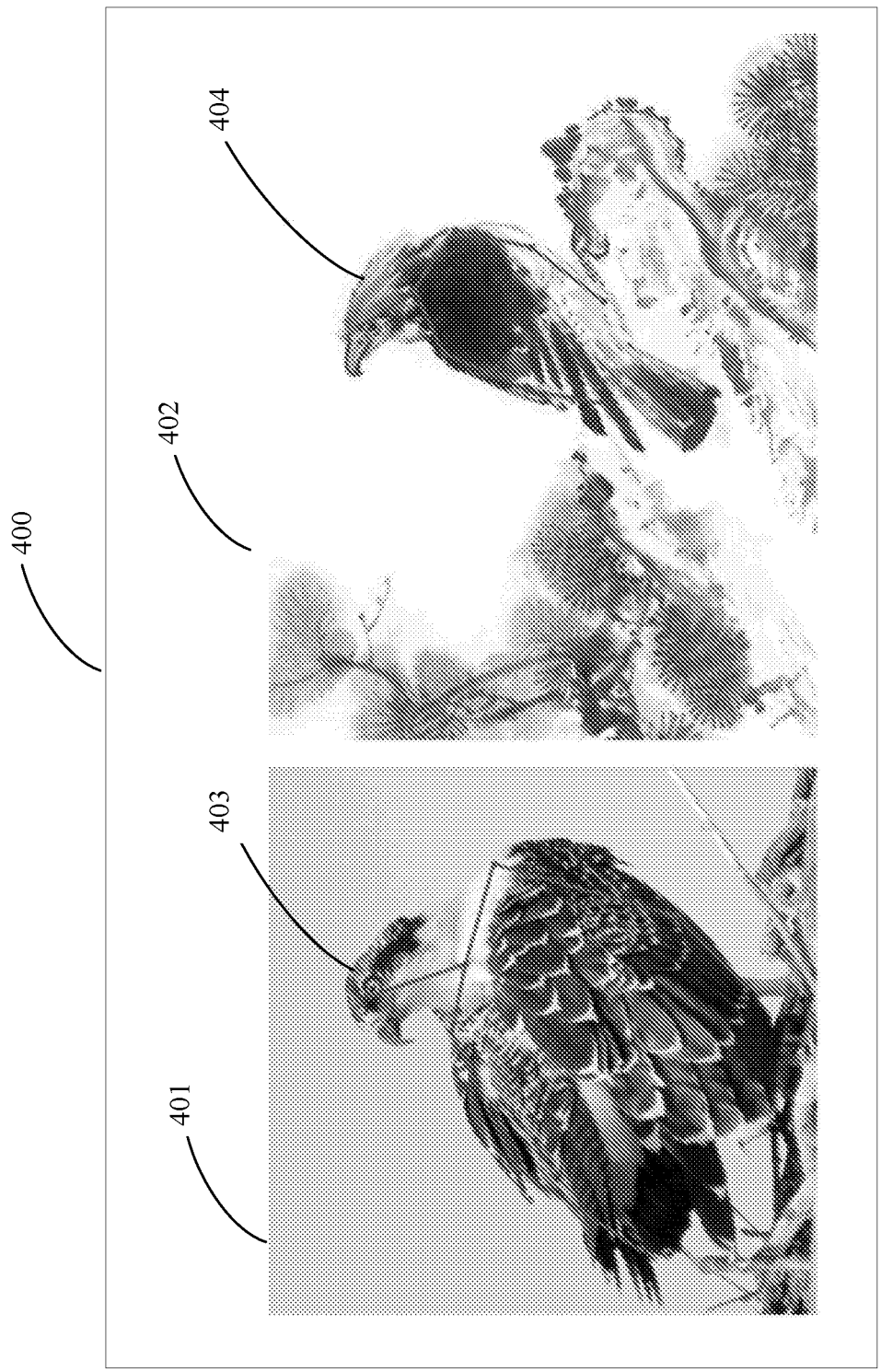
FIG. 4 is a block diagram of another exemplary picture for image processing of embodiments of the present disclosure.

In the block diagram 400 of an exemplary image for image processing of embodiments of the present disclosure as shown in FIG. 4, a picture 401 on the left may correspond to the first picture as described above and may be a photo of portrait, and the picture 402 on the right may correspond to the second picture as described above and may be an image of brush painting. More particularly, a bird image 403 in the picture 401 may correspond to the first object image, and a bird image 404 in the picture 402 may correspond to the second object image. It can be seen from the block diagram 400 that, the feature points selected from the bird image 403 may approximately match with the feature points selected from the bird image 404 in both positions and amount.

In the above, explanation has been made on the general steps for image processing of embodiments of the present disclosure. In practical implementation, for better effects of image processing, some pre-processing work may be performed before the processing of image fusion.

Figure 5:
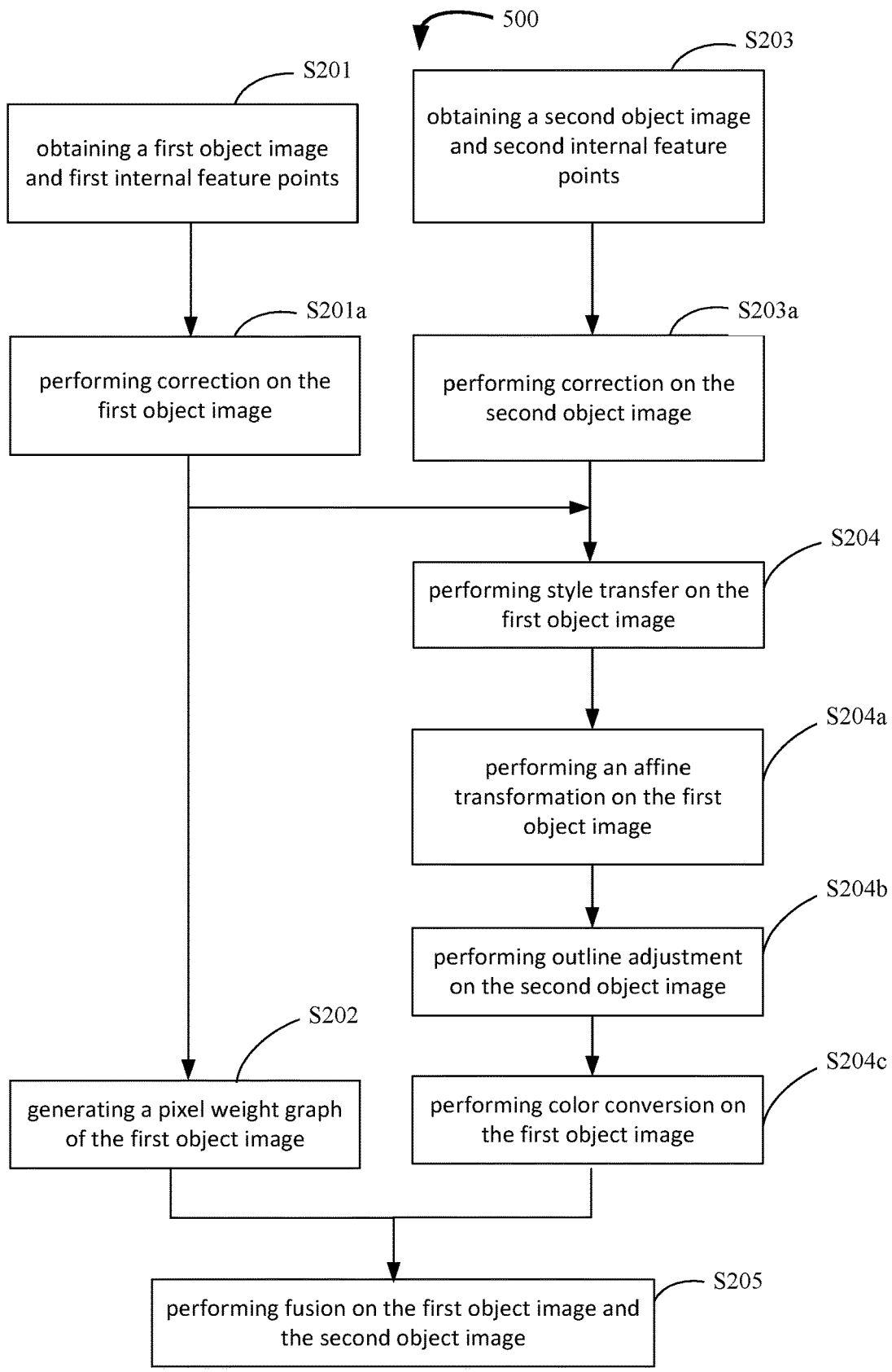
FIG. 5 is a schematic flowchart showing another processing procedure of an image processing method of embodiments of the present disclosure.

As shown in FIG. 5, which is a schematic flowchart 500 showing another processing procedure of an image processing method of embodiments of the present disclosure, for better fusion between the main feature points of the first object image and the second object image, before the image fusion processing of the step of S205 described above, the method may further include:

S204a, performing an affine transformation on the first object image according to the first internal feature points and the second internal feature points, so that the first internal feature points of the first object image subjected to affine transformation and the second internal feature points of the second object image may be aligned with each other. The processing of this step may be performed by the image transformation module 105.

In some cases, the objects presented in the first object image and the second object image may have difference in gestures. To eliminate such difference, the first object image and the second object image may be subject to correction so as to be matched with a standard object image template. The standard object image template may be a template preset according to the content of the first object image and the second object image in advance. For example, both the first object image and the second object image may be images of human faces, and there are possible cases that the human face is inclined upward or downward, or the human face turns to one side a little, and so on. In such cases, the standard object image template may be an image template showing a human face in a standard state, in which the human face is facing forward directly. The standard object image template may show some certain gestures as needed, without being limited to the standard gesture in normal sense.

As shown in FIG. 5, before performing the style transfer of the step of S204, the method may further include the following steps.

S201a, performing correction on the first object image according to the first internal feature points or according to the first internal feature points and the boundary of the first object image, so that the first object image may be matched with a standard object image template. This step of S201a may be performed by the first image processing module 102.

S203a, performing correction on the second object image according to the second internal feature points or according to the second internal feature points and the boundary of the second object image, so that the second object image may be matched with a standard object image template. This step of S203a may be performed by the second image processing module 103.

Furthermore, in some cases, there may be some shades in the first object image, and then before the style transfer of step of S204, the method may further include: performing shade elimination processing on the first object image. This step may be performed by the first image processing module 102.

In some cases, the first object image and the second object image may be unmatched well in size, and before performing the image fusion of the above step of S205, the method may further include the following steps.

S204b, performing outline adjustment on the second object image according to the boundary of the first object image, so that the second object image and the first object image may be matched with each other in outlines. This step may be performed by the image transformation module 105.

In some cases, although being subjected to image style transfer processing, there is some difference between the color distribution of the first object image and the color distribution of the second object image. In view of such problem, before performing the image fusion processing of the step of S205 described above, the method of embodiments of the present disclosure may further include:

S204c, performing color conversion on the first object image subjected to style transfer so that the color distribution of the first object image may be matched with the color distribution of the second object image. This step may be performed by the image transformation module 105.

It should be noted that, there is no relationship and/or limitation of the orders of the above steps S204a, S204b, and S204c, and the order relationship therebetween may be changed as needed.

Furthermore, in the embodiments of the present disclosure, one or more second internal feature points of the second object image may be obtained for the processing such as affine transformation or image correction in the subsequent procedures. In some cases, if the first object image and the second object image are matched with each other well or both the first object image and the second object image are matched with a standard image template well, it may be unnecessary to perform the affine transformation or image correction, and in the step of S203, it may be unnecessary to obtain the second internal feature points of the second object image.

In view of the above, with the image processing method and image processing device of embodiments of the present disclosure, a first object image in a first picture may be integrated naturally into a second object image of a second picture by image fusion, so as to form a new picture with the style of the second picture. In some cases, the first picture as a source picture may be a picture provided by a user (e.g., a photo of a user), and the second picture as a template picture may be a picture provided by an APP. With the image processing of embodiments of the present disclosure, the source picture provided by a user may be merged into a template picture to generate a picture with the user's character and the style of the template picture. These pictures may be used as a profile photo of a user or embedded into an article issued by a user, so as to offer some fun in image applications.

Embodiments

Figure 6:
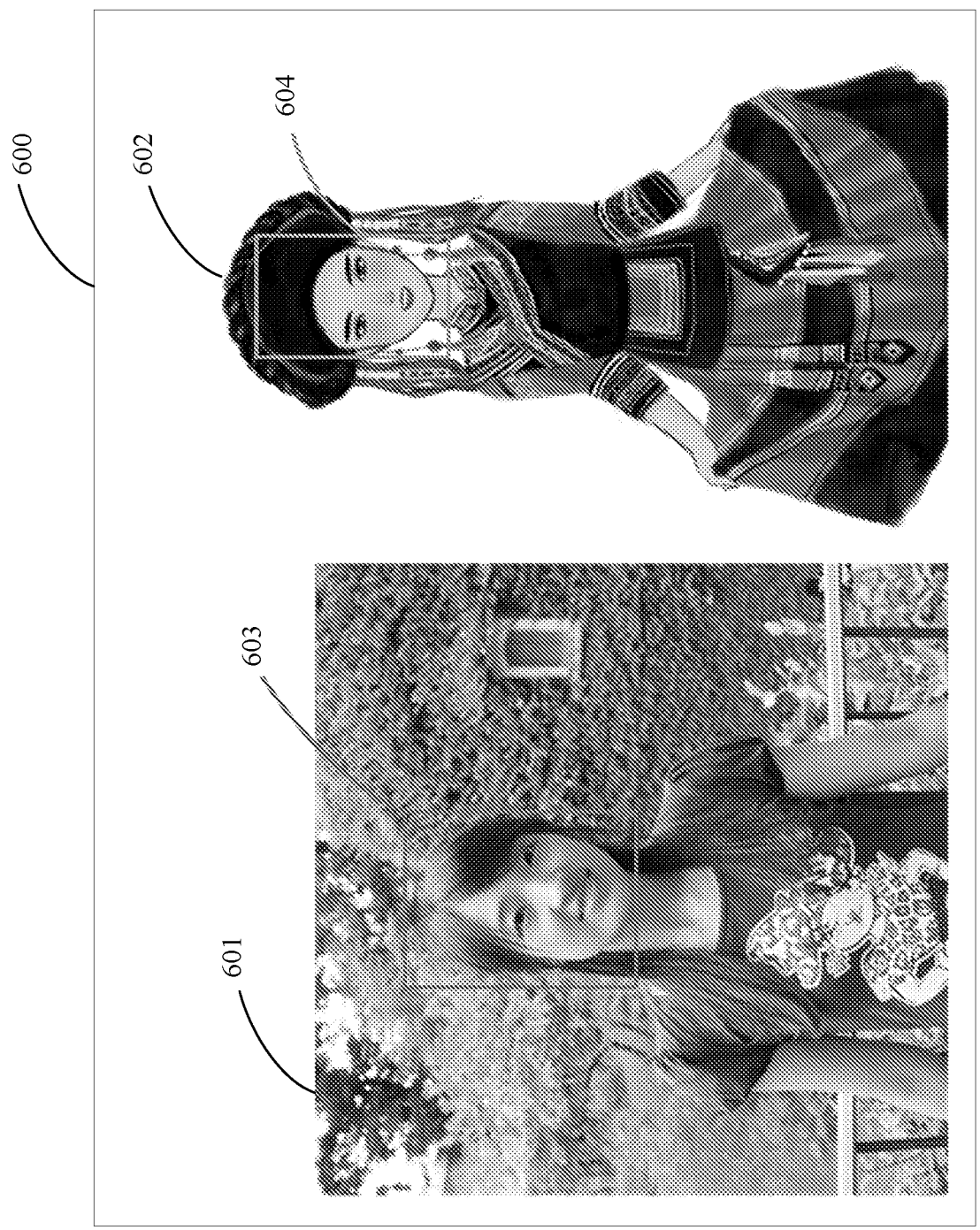
FIG. 6 is a block diagram of an exemplary picture for image processing of embodiments of the present disclosure.

Embodiments would be used to provide further description on the technical solution of the present disclosure in the following. As shown in FIG. 6, which is a block diagram 600 of an exemplary image for image processing of embodiments of the present disclosure, the picture 601 on the left may be corresponding to the first picture described above, the picture 602 on the right may be corresponding to the second picture described above. More particularly, the picture 601 is a source picture input by a user and a photo taken by the user himself/herself. A user face image 603 in the picture 601 may correspond to the first object image described above; the picture 602 may be a template picture preset in an APP and in a style of cartoon picture. A face image 604 in the picture 602 may correspond to the second object image described above.

In the embodiments of the present disclosure, the picture 601 input by the user may be used as a source picture, and the picture 602 may be used as a template picture. The user face image 603 may be integrated onto the face image 604 of the picture 602 on the right by image fusion so as to generate a new image with facial characters of the user and merged into the picture 602 with the style of cartoon image. The processing on images may be as follows.

1, Processing on a Picture Input by a User

Figure 7:
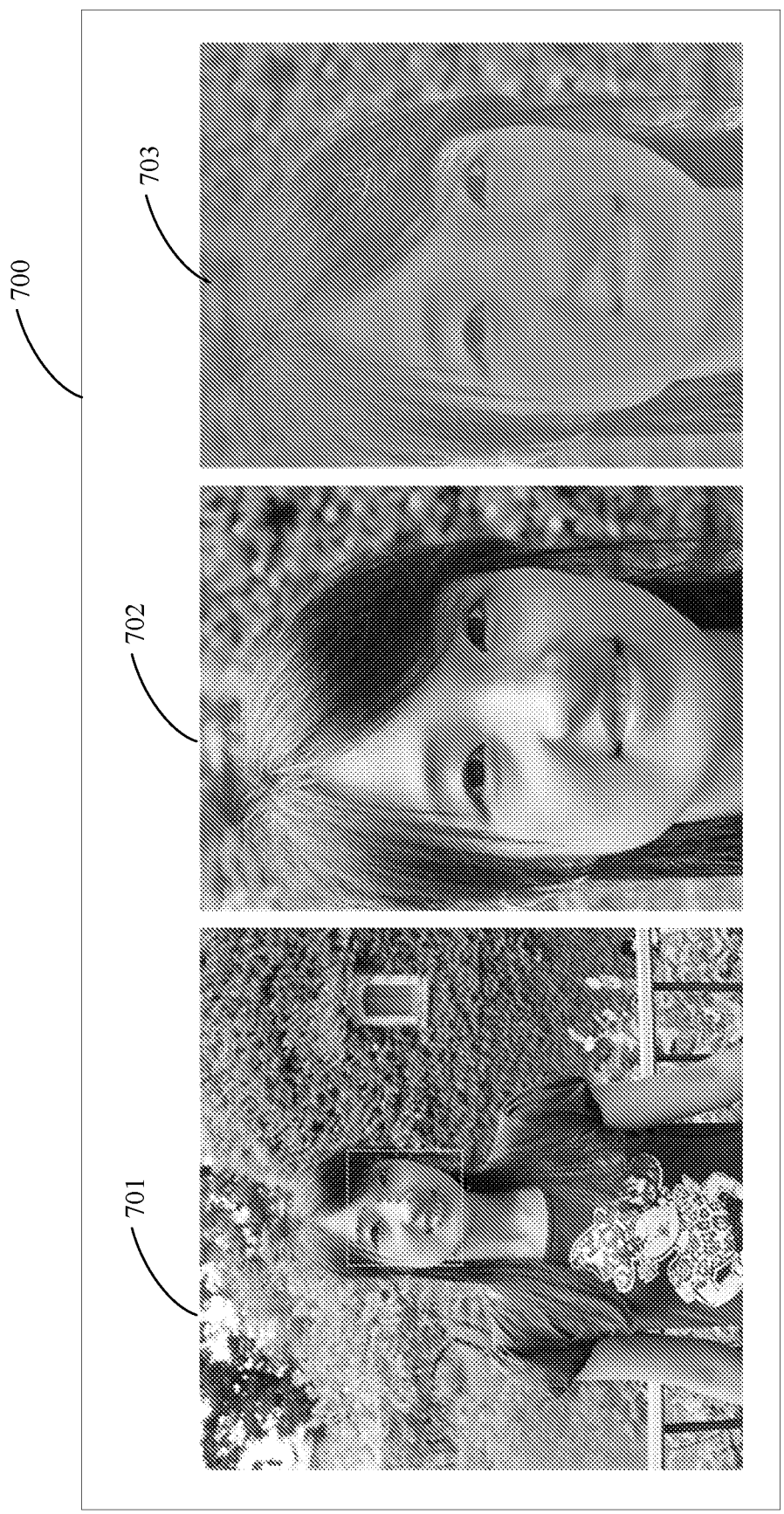
FIG. 7 is a block diagram of an exemplary picture for image processing of embodiments of the present disclosure.

As shown in FIG. 7, which is a block diagram 700 of an exemplary image for image processing of embodiments of the present disclosure, the picture 601 input by a user may be subjected to the following processing.

(1) performing detection on a face image to determine landmarks of the face. These landmarks may include a first internal feature points and a first edge feature points as shown by the image 701. According to these feature points, the outlines of the face of the user and the positions and features of the facial parts such as eyes, eyebrows, nose, mouth may be identified. The bounding box of the whole face may be formed according to the identified outlines.

(2) performing correction on the face image 601 according to the first internal feature points and the bounding box of the face so as to adjust the gesture of the face to face forward and make the facial parts in the standard positions to generate a face image 702.

(3) eliminating the shades on the face image of the user to generate a face image 703.

2, A Processing on the Template Image

Figure 8:
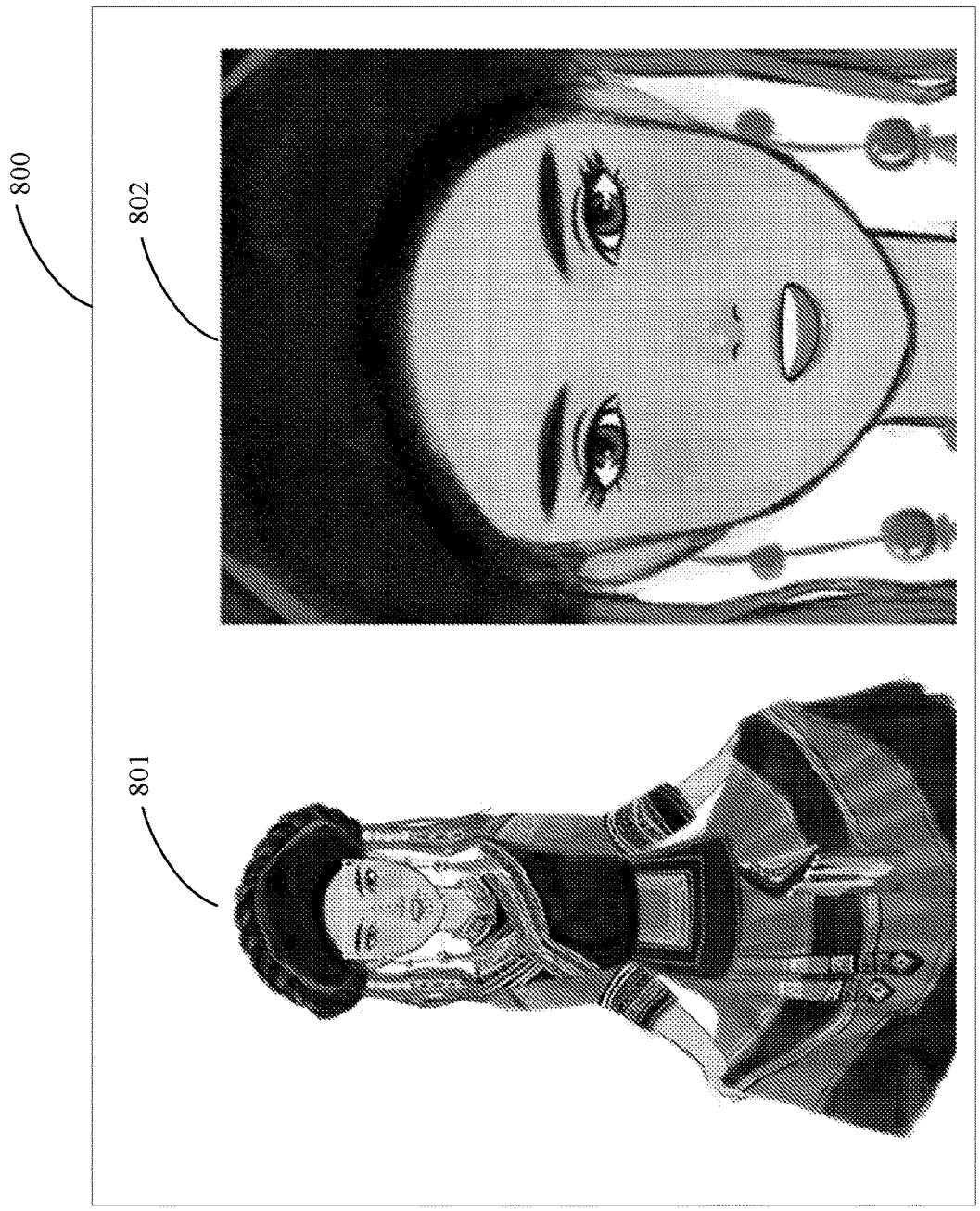
FIG. 8 is a block diagram of an exemplary picture for image processing of embodiments of the present disclosure.

As shown in FIG. 8, which is a block diagram 800 of an exemplary image for image processing of embodiments of the present disclosure, the template image 602 preset in an APP may be subjected to the following processing.

(1) performing detection on a face image to determine landmarks of the face. These landmarks may include a second internal feature points and a second edge feature points as shown by the image 801. According to these feature points, the outlines of the face of the user and the positions and features of the facial parts such as eyes, eyebrows, nose, mouth may be identified. The bounding box of the whole face may be formed according to the identified outlines.

(2) performing correction on the template image 602 according to the second internal feature points and the bounding box of the face so as to adjust the gesture of the face to face forward and make the facial parts in the standard positions to generate a face image 802.

3, Style Transfer

Figure 9:
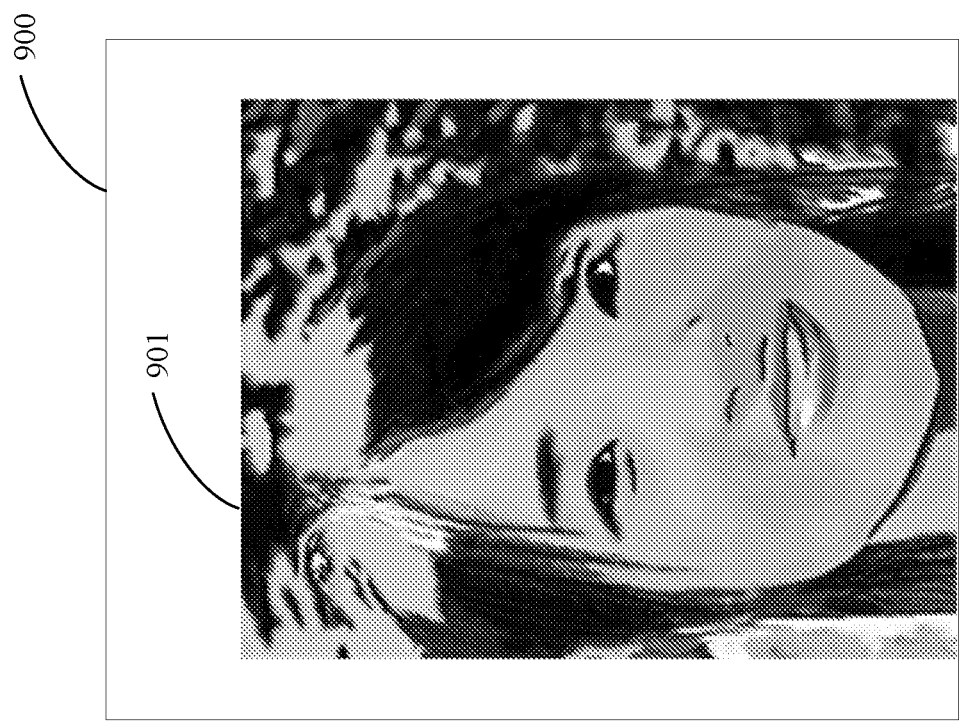
FIG. 9 is a block diagram of an exemplary picture for image processing of embodiments of the present disclosure.

As shown in FIG. 9, which is a block diagram 900 of an exemplary image for image processing of embodiments of the present disclosure, the image style transfer may be performed on the face image 703 with the face image 802 as a template to generate a face image 901 of the user subjected to style transfer.

4, Processing of Affine Transformation

Figure 10:
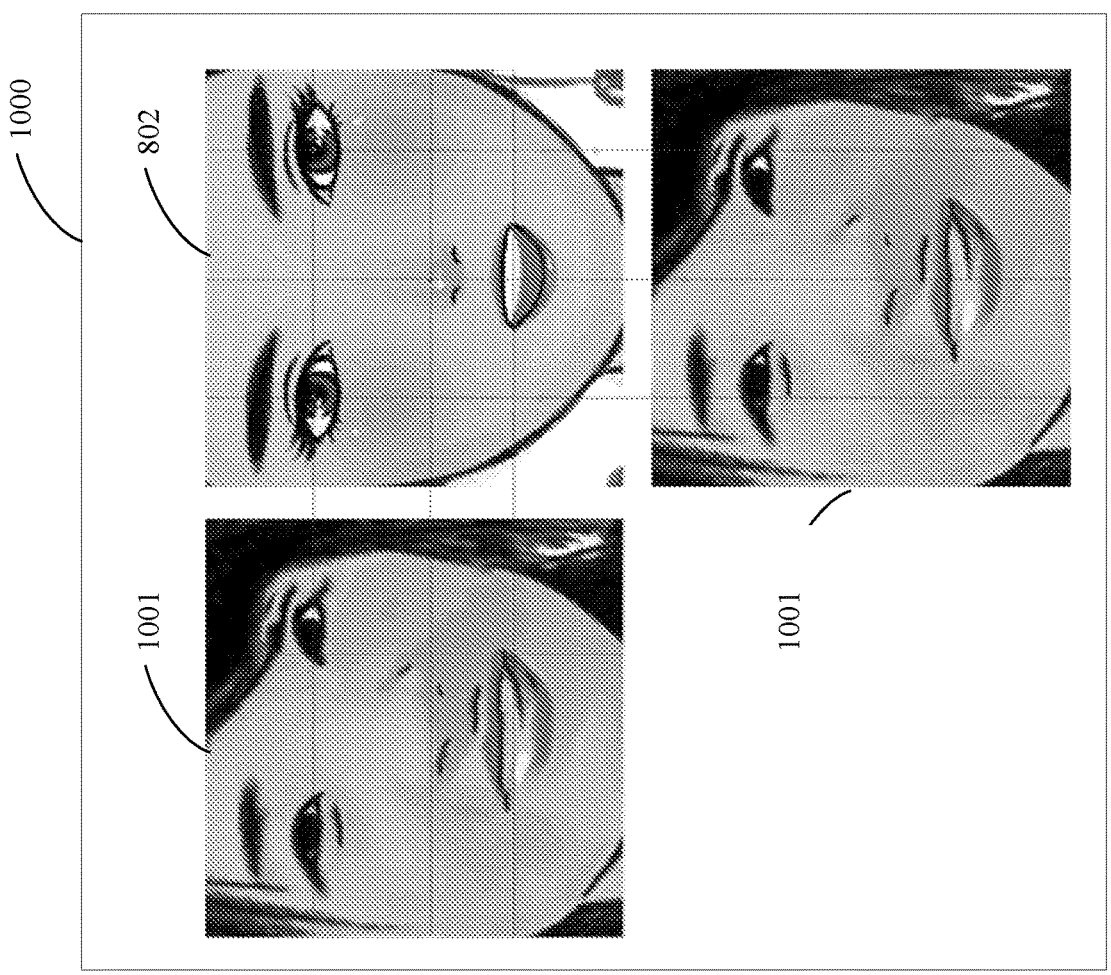
FIG. 10 is a block diagram of an exemplary picture for image processing of embodiments of the present disclosure.

As shown in FIG. 10, which is a block diagram 1000 of an exemplary image for image processing of embodiments of the present disclosure, the processing of affine transformation may be as follows: performing affine transformation on a face image 901 of a user according to the first internal feature points and the second internal feature points to generate a face image 1001 subjected to affine transformation. With the processing of affine transformation, the positions of facial parts of the face image 1001 subjected to affine transformation may be aligned with the positions of facial parts of the face image 802 (only the images of facial parts of the face image 802 are shown in FIG. 10). Both the image on the up-left side and the image on the down-right side in FIG. 10 may be the image face 1001, and the passion arrangement in FIG. 10 is merely to illustrate that the positions of the facial parts of the face image 1001 subjected to affine transformation are aligned with the face image 802 in both the horizontal and vertical directions.

5, Generating a Pixel Weight Graph

Figure 11:
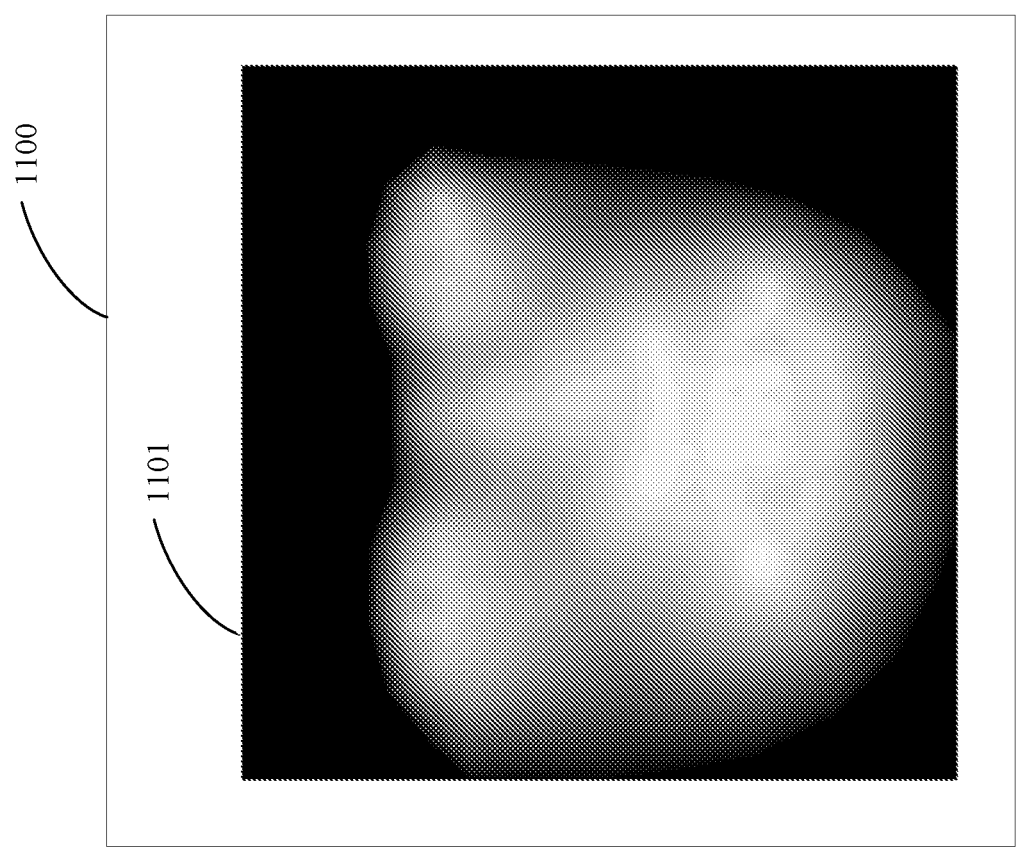
FIG. 11 is a block diagram of an exemplary picture for image processing of embodiments of the present disclosure.

As shown in FIG. 11, which is a block diagram 1100 of an exemplary image for image processing of embodiments of the present disclosure, the processing for generating a pixel weight graph may be as follows: calculating distance from each of the first internal feature points to the edge of outlines of the face according to the positions of the first internal feature points and the edge of outlines of the face in the face image 901. Then, the weights may be assigned to each pixel according to the following rules: the weights assigned to the first internal feature points in a range of the edge of outlines of the face are highest, and then the weights of each pixel may be decreased gradually in a range from each first internal feature points to the edge of outline of the face till the edge of the outline of the face so as to generate the pixel weight graph 1101 finally.

6, Color Conversion

Figure 12:
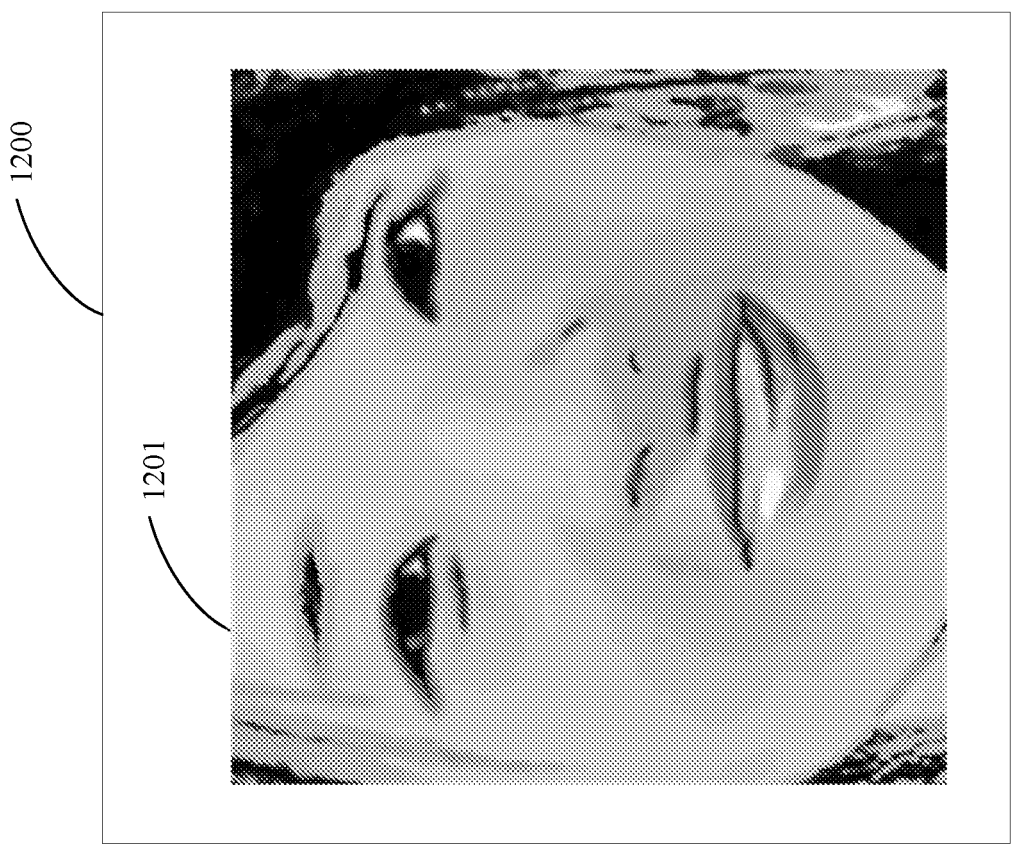
FIG. 12 is a block diagram of an exemplary picture for image processing of embodiments of the present disclosure.

As shown in FIG. 12, which is a block diagram 1200 of an exemplary image for image processing of embodiments of the present disclosure, in order to make the color distribution of the face in the face image of the user matched with the color distribution in the template picture better, a processing of color conversion may be performed on the face image 1001 generated after style transfer and affine transformation to generate a face image 1201.

7, Adjusting on Outlines of Template

Figure 13:
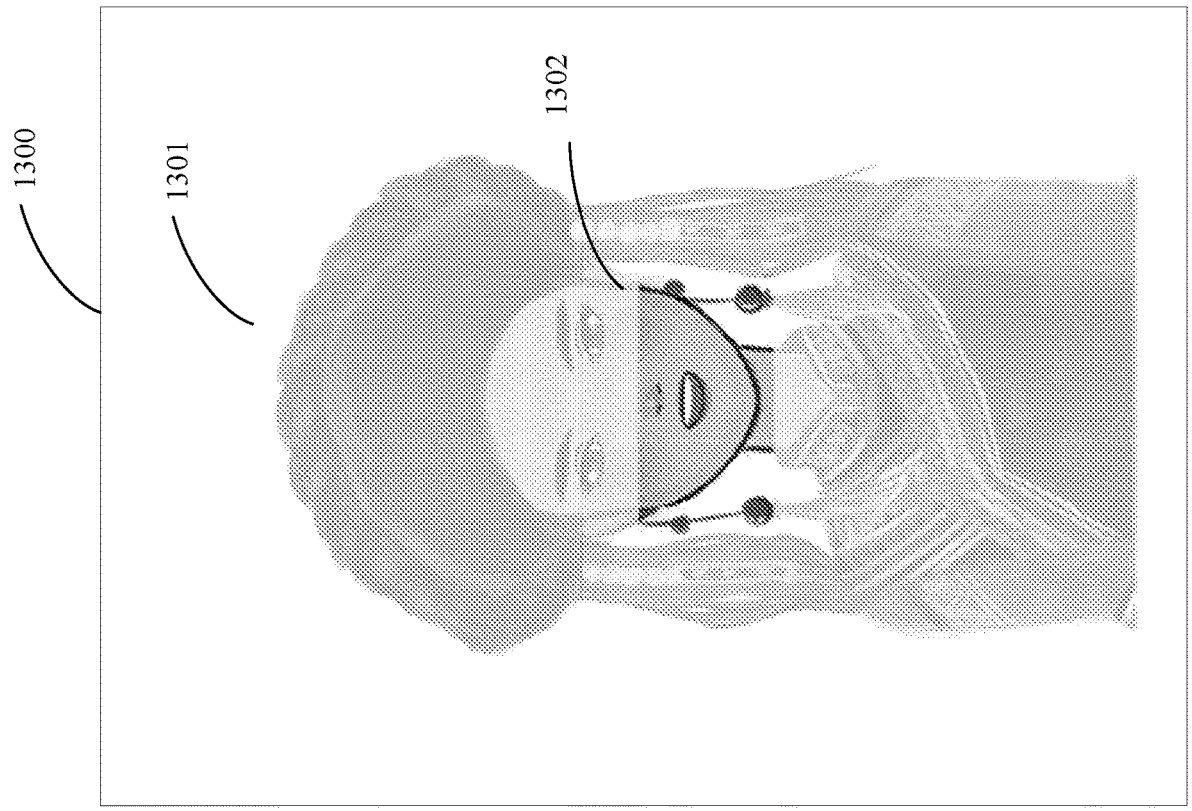
FIG. 13 is a block diagram of an exemplary picture for image processing of embodiments of the present disclosure.

As shown in FIG. 13, which is a block diagram 1300 of an exemplary image for image processing of embodiments of the present disclosure, in order for the face image in the template picture to better fit the face image of the user in outlines, the outlines of the face image 802 in the template picture 602 may be adjusted to generate a template picture 1301 (in FIG. 13, the parts other than the outlines are blurred in order to highlight the changed parts of the outlines). A face image 1302, which is subjected to the outline adjustment may be included in the template picture 1301. It can be seen from the template picture 1301 that the jaw part of the face image 802 is sharper, while in the face image 901 of the user, the jaw part is rounder compared with the jaw part of the face image 802. Therefore, adjustment may be performed on the face image 802 in the template picture 602, so that the jaw part of the face image 802 may be rounder (the curves of the jaw part of the face image 1302 is rounder than the curves of the jaw part of the face image 802), and therefore, the face image 802 may be matched with the face image 901 of the user in the shape of jaw part. Therefore, more features of the face image of the user may be kept.

8, Image Fusion

Figure 14:
FIG. 14 is a block diagram of an exemplary picture for image processing of embodiments of the present disclosure.

As shown in FIG. 14, which is a block diagram 1400 of an exemplary image for image processing of embodiments of the present disclosure, in the processing of image fusion, the face image 1201 may be integrated into the face image 1302 in the template picture 1301 by image fusion to generate an image 1401 with both the facial features of the user and a style of the template picture.

Specific Embodiments

In some examples, one or more components or modules and one or more steps as shown in FIG. 1 to FIG. 14 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 15:
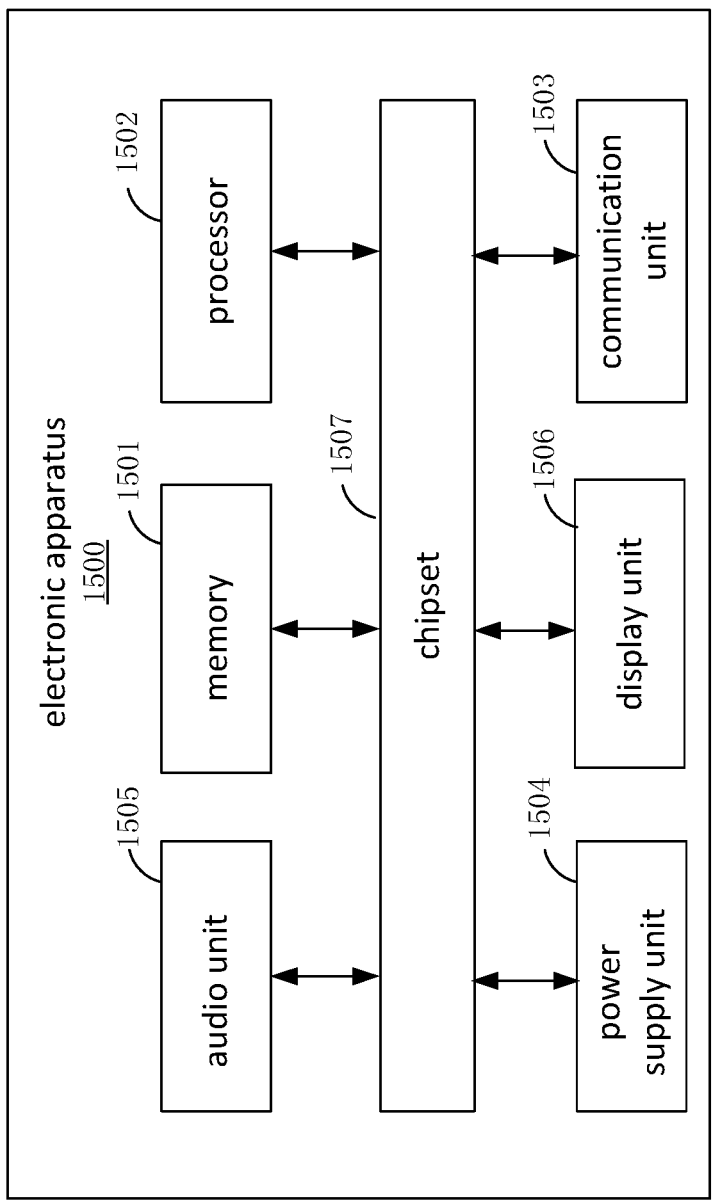
FIG. 15 is a schematic structural block diagram of an electronic apparatus of embodiments of the present disclosure.

As shown in FIG. 15, which is a schematic structural block diagram of an electronic apparatus 1500 of embodiments of the present disclosure, the electronic apparatus 1500 may include: a memory 1501 and a processor 1502.

The memory 1501 may be configured to store programs. In addition to the above programs, the memory 1501 may be configured to store other data to support operations on the electronic apparatus 1500. The examples of these data may include instructions of any applications or methods operated on the electronic apparatus 1500, contact data, phone book data, messages, pictures, videos, and the like.

The memory 1501 may be implemented by any kind of volatile or nonvolatile storage device or their combinations, such as static random access memory (SRAM), electronically erasable programmable read-only memory (EE-PROM), erasable programmable read-only memory (EPROM), programmable read-only memory (PROM), read-only memory (ROM), magnetic memory, flash memory, disk memory, or optical disk.

In some examples, the memory 1501 may be coupled to the processor 1502 and contain instructions stored thereon. The instructions may cause the electronic apparatus 1500 to perform operations upon being executed by the processor 1502, the operations may include:

obtaining a first object image in a first picture and one or more internal feature points of the first object image to generate a pixel weight graph of the first object image, and in the pixel weight graph, the weights of the first internal feature points are higher than the weights of the points other than the first internal feature points, obtaining a second object image in a second picture, and performing a style transfer on the first object image with the second object image as a style reference template;

integrating the first object image subjected to style transfer and the second object image in the second picture by image fusion according to the pixel weight graph of the first object image.

More particularly, the generating a pixel weight graph of the first object image may further include:

generating the pixel weight graph of the first object image according to the first internal feature points and a boundary of the first object image, and in the pixel weight graph, the values of the weights of pixels of the first object image may be in a distribution of decreasing from the first internal feature points to the boundary.

More particularly, the integrating the first object image subjected to style transfer and the second object image in the second picture by image fusion according to the pixel weight graph of the first object image may include:

integrating pixels of the first object image and the second object image by fusion according to the weights corresponding to each points in the pixel weight graph, so that in each pixel subjected to fusion, the higher the weight of the pixel is, the closer the property value of the pixel is to the property value of the pixel of the first object image subjected to the style transfer, and the lower the weight of the pixel is, the closer the property of the pixel is to the property value of the pixel of the second object image.

More particularly, before the integrating the first object image subjected to style transfer and the second object image in the second picture by image fusion according to the pixel weight graph of the first object image, the operations may further include:

obtaining one or more second internal feature points of the second object image;

performing an affine transformation on the first object image according to the first internal feature points and the second internal feature points, so that the first internal feature points of the first object image subjected to the affine transformation are aligned with the second internal feature points of the second object image.

Detailed description has been made on the above operations in the above embodiments of method and device. The description on the above operations may be applied to electronic apparatus 1500. That is to say, the specific operations mentioned in the above embodiments may be recorded in memory 1501 in program and be performed by processor 1502.

Furthermore, as shown in FIG. 15, the electronic apparatus 1500 may further include: a communication unit 1503, a power supply unit 1504, an audio unit 1505, a display unit 1506, chipset 1507, and other units. Only part of units are exemplarily shown in FIG. 15 and it is obvious to one skilled in the art that the electronic apparatus 1500 only includes the units shown in FIG. 15.

The communication unit 1503 may be configured to facilitate wireless or wired communication between the electronic apparatus 1500 and other apparatuses. The electronic apparatus may be connected to wireless network based on communication standard, such as WiFi, 2G, 3G, or their combination. In an exemplary example, the communication unit 1503 may receive radio signal or radio related information from external radio management system via radio channel. In an exemplary example, the communication unit 1503 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 1504 may be configured to supply power to various units of the electronic device. The power supply unit 1504 may include a power supply management system, one or more power supplies, and other units related to power generation, management, and allocation.

The audio unit 1505 may be configured to output and/or input audio signals.

For example, the audio unit 1505 may include a microphone (MIC). When the electronic apparatus in an operation mode, such as calling mode, recording mode, and voice recognition mode, the MIC may be configured to receive external audio signals. The received audio signals may be further stored in the memory 1501 or sent via the communication unit 1503. In some examples, the audio unit 1505 may further include a speaker configured to output audio signals.

The display unit 1506 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 1501, processor 1502, communication unit 1503, power supply unit 1504, audio unit 1505 and display unit 1506 may be connected with the chipset 1507. The chipset 1507 may provide interface between the processor 1502 and other units of the electronic apparatus 1500. Furthermore, the chipset 1507 may provide interface for each unit of the electronic apparatus 1500 to access the memory 1501 and communication interface for accessing among units.

Example Clauses

A. A method, including:
obtaining a first object image in a first picture and one or more internal feature points of the first object image to generate a pixel weight graph of the first object image, and in the pixel weight graph, the weights of the first internal feature points are higher than the weights of points other than the first internal feature points;
obtaining a second object image in a second picture, and performing a style transfer on the first object image with the second object image as a style reference template; and
integrating the first object image subjected to the style transfer and the second object image in the second picture by image fusion according to the pixel weight graph of the first object image.

B. The method according to paragraph A, wherein the generating a pixel weight graph of the first object image includes:
generating the pixel weight graph of the first object image according to the first internal feature points and a boundary of the first object image, and in the pixel weight graph, the values of the weights of pixels of the first object image may be in a distribution of decreasing from the first internal feature points to the boundary.

C. The method according to paragraph A, wherein the integrating the first object image subjected to style transfer and the second object image in the second picture by image fusion according to the pixel weight graph of the first object image includes:
performing fusion on pixels of the first object image and the second object image according to the weight corresponding to each point in the pixel weight graph, so that in each pixel subjected to fusion, the higher the weight of the pixel is, the closer the attribute value of the pixel is to the attribute value of the pixel of the first object image subjected to the style transfer, and the lower the weight of the pixel is, the closer the attribute value of the pixel is to the attribute value of the pixel of the second object image.

D. The method according to paragraph A, wherein before the integrating the first object image subjected to style transfer and the second object image in the second picture by image fusion according to the pixel weight graph of the first object image, the method further includes:
obtaining one or more second internal feature points of the second object image; and
performing an affine transformation on the first object image according to the first internal feature points and the second internal feature points, so that the first internal feature points of the first object image subjected to the affine transformation are aligned with the second internal feature points of the second object image.

E. The method according to paragraph A, wherein, before the performing a style transfer on the first object image with the second object image as a style reference template, the method further includes:
performing correction on the first object image according to the first internal feature points or according to both the first internal feature points and the boundary of the first object image, so that the first object image is matched with a standard object image template.

F. The method according to paragraph A, wherein before the performing a style transfer on the first object image with the second object image as a style reference template, the method further includes:
obtaining second internal feature points of the second object image; and
performing correction on the second object image according to the second internal feature points or according to both the second internal feature points and the boundary of the second object image, so that the second object image is matched with a standard object image template.

G. The method according to paragraph A, wherein, before the performing a style transfer on the first object image with the second object image as a style reference template, the method further includes:
performing a processing of shades eliminating on the first object image.

H. The method according to paragraph A, wherein before the integrating the first object image subjected to the style transfer and the second object image in the second picture by image fusion according to the pixel weight graph of the first object image, the method further includes:
performing outline adjustment on the second object image according to the boundary of the first object image so that the second object image is matched with the first object image in outlines.

I. The method according to paragraph A, wherein before the integrating the first object image subjected to the style transfer and the second object image in the second picture by image fusion according to the pixel weight graph of the first object image, the method further includes:
performing color conversion on the first object image subjected to the style transfer, so that a color distribution of the first object image is matched with a color distribution of the second object image.

J. The method according to paragraph A, wherein, the first object and the second object are the objects of the same kind, and the second object image contains one or more second internal feature points matched with the first internal feature points in positions.

K. The method according to paragraph J, wherein the first object image and the second object image are face images of human beings, and the first internal feature points and the second internal feature points are landmarks corresponding to facial parts of the face of human beings.

L. A device, including:
a first picture processing module, configured to obtain a first object image in a first picture and one or more internal feature points of the first object image
a second picture processing module, configured to obtain a second object image in a second picture,
a pixel weight graph generating module, configured to generate a pixel weight graph of the first object image, wherein in the pixel weight graph, the weights of the first internal feature points are higher than the weights of points other than the first internal feature points;
an image transformation module, configured to perform a style transfer on the first object image with the second object image as a style reference template;
an image fusion module, configured to integrate the first object image subjected to the style transfer and the second object image in the second picture by image fusion according to the pixel weight graph of the first object image.

M. The device according to claim 12, wherein the generating a pixel weight graph of the first object image includes:

generating the pixel weight graph of the first object image according to the first internal feature points and a boundary of the first object image, and in the pixel weight graph, the values of the weights of pixels of the first object image decrease from the first internal feature points to the boundary.

N. The device according to claim 12, wherein the integrating the first object image subjected to style transfer and the second object image in the second picture by image fusion according to the pixel weight graph of the first object image includes:

performing fusion on pixels of the first object image and the second object image according to the weights corresponding to each points in the pixel weight graph, so that in each pixel subjected to fusion, the higher the weight of the pixel is, the closer the attribute value of the pixel is to the attribute value of the pixel of the first object image subjected to the style transfer, and the lower the weight of the pixel is, the closer the attribute value of the pixel is to the attribute value of the pixel of the second object image.

O. The device according to claim 12, wherein the second picture processing module is further configured to obtain one or more second internal feature points of the second object image; and the image transformation module is further configured to perform an affine transformation on the first object image according to the first internal feature points and the second internal feature points, so that the first internal feature points of the first object image subjected to the affine transformation are aligned with the second internal feature points of the second object image, before the integrating the first object image subjected to style transfer and the second object image in the second picture by image fusion according to the pixel weight graph of the first object image.

P. An electronic apparatus, including:
a processing unit; and
a memory, coupled to the processing unit and containing instructions stored thereon, the instructions cause the electronic apparatus to perform operations upon being executed by the processing unit, the operations include:
obtaining a first object image in a first picture and one or more internal feature points of the first object image to generate a pixel weight graph of the first object image, and in the pixel weight graph, the weights of the first internal feature points are higher than the weights of points other than the first internal feature points;
obtaining a second object image in a second picture, and performing a style transfer on the first object image with the second object image as a style reference template; and
integrating the first object image subjected to the style transfer and the second object image in the second picture by image fusion according to the pixel weight graph of the first object image.

Q. The electronic apparatus according to paragraph P, wherein the generating a pixel weight graph of the first object image includes:
generating the pixel weight graph of the first object image according to the first internal feature points and a boundary of the first object image, and in the pixel weight graph, the values of the weights of pixels of the first object image decrease from the first internal feature points to the boundary.

R. The electronic apparatus according to paragraph P, wherein the integrating the first object image subjected to style transfer and the second object image in the second picture by image fusion according to the pixel weight graph of the first object image includes:

performing fusion on pixels of the first object image and the second object image according to the weights corresponding to each points in the pixel weight graph, so that in each pixel subjected to fusion, the higher the weight of the pixel is, the closer the attribute value of the pixel is to the attribute value of the pixel of the first object image subjected to the style transfer, and the lower the weight of the pixel is, the closer the attribute value of the pixel is to the attribute value of the pixel of the second object image.

S. The electronic apparatus according to paragraph P, wherein before the integrating the first object image subjected to style transfer and the second object image in the second picture by image fusion according to the pixel weight graph of the first object image, the operations further include:
obtaining one or more second internal feature points of the second object image; and
performing an affine transformation on the first object image according to the first internal feature points and the second internal feature points, so that the first internal feature points of the first object image subjected to the affine transformation are aligned with the second internal feature points of the second object image.

CONCLUSION

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation", "one implementation", "some implementations", or "other implementations" may mean that a particular feature, structure, or characteristic described in connection with one or more implementations may be included in at least some implementations, but not necessarily in all implementations. The various appearances of "an implementation", "one implementation", or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. A device comprising a processor coupled to a memory, the processor comprising:
   a first image processing module configured to obtain a first object image in a first picture and one or more internal feature points of the first object image;
   a second image processing module configured to obtain a second object image in a second picture;
   a pixel weight graph generating module configured to generate a pixel weight graph of the first object image, wherein in the pixel weight graph, the weights of the first internal feature points are higher than the weights of points other than the first internal feature points;
   an image transformation module configured to perform a style transfer on the first object image with the second object image as a style reference template; and
   an image fusion module configured to integrate the first object image subjected to the style transfer and the second object image in the second picture by fusion according to the pixel weight graph of the first object image; wherein the integrating the first object image subjected to style transfer and the second object image in the second picture by fusion according to the pixel weight graph of the first object image comprises:
   performing fusion on pixels of the first object image and the second object image according to the weight corresponding to each point in the pixel weight graph, so that in each pixel subjected to fusion, the higher the weight of the pixel is, the closer the attribute value of the pixel is to the attribute value of the pixel of the first object image subjected to the style transfer, and the lower the weight of the pixel is, the closer the attribute value of the pixel is to the attribute value of the pixel of the second object image.

2. The device according to claim 1, wherein the generating a pixel weight graph of the first object image comprises:
   generating the pixel weight graph of the first object image according to the first internal feature points and a boundary of the first object image, and in the pixel weight graph, the values of the weights of pixels of the first object image are in a distribution of decreasing from the first internal feature points to the boundary.

3. The device according to claim 1, wherein the second image processing module is further configured to obtain one or more second internal feature points of the second object image; and
   the image transformation module is further configured to perform an affine transformation on the first object image according to the first internal feature points and the second internal feature points, so that the first internal feature points of the first object image subjected to the affine transformation are aligned with the second internal feature points of the second object image, before the integrating the first object image subjected to style transfer and the second object image in the second picture by fusion according to the pixel weight graph of the first object image.

4. A method, comprising:
   obtaining a first object image in a first picture and one or more internal feature points of the first object image to generate a pixel weight graph of the first object image, and in the pixel weight graph, the weights of the first internal feature points are higher than the weights of points other than the first internal feature points;

obtaining a second object image in a second picture, and performing a style transfer on the first object image with the second object image as a style reference template; and integrating the first object image subjected to the style transfer and the second object image in the second picture by fusion according to the pixel weight graph of the first object image, wherein the integrating the first object image subjected to style transfer and the second object image in the second picture by fusion according to the pixel weight graph of the first object image comprises:

performing fusion on pixels of the first object image and the second object image according to the weight corresponding to each point in the pixel weight graph, so that in each pixel subjected to fusion, the higher the weight of the pixel is, the closer the attribute value of the pixel is to the attribute value of the pixel of the first object image subjected to the style transfer, and the lower the weight of the pixel is, the closer the attribute value of the pixel is to the attribute value of the pixel of the second object image.

5. The method according to claim 4, wherein the generating a pixel weight graph of the first object image comprises:

generating the pixel weight graph of the first object image according to the first internal feature points and a boundary of the first object image, and in the pixel weight graph, the values of the weights of pixels of the first object image are in a distribution of decreasing from the first internal feature points to the boundary.

6. The method according to claim 4, wherein before the integrating the first object image subjected to style transfer and the second object image in the second picture by fusion according to the pixel weight graph of the first object image, the method further comprises:

obtaining one or more second internal feature points of the second object image; and performing an affine transformation on the first object image according to the first internal feature points and the second internal feature points, so that the first internal feature points of the first object image subjected to the affine transformation are aligned with the second internal feature points of the second object image.

7. The method according to claim 4, wherein before the performing a style transfer on the first object image with the second object image as a style reference template, the method further comprises:

performing correction on the first object image according to the first internal feature points or according to both the first internal feature points and the boundary of the first object image, so that the first object image is matched with a standard object image template.

8. The method according to claim 4, wherein before the performing a style transfer on the first object image with the second object image as a style reference template, the method further comprises:

obtaining second internal feature points of the second object image; and performing correction on the second object image according to the second internal feature points or according to both the second internal feature points and the boundary of the second object image, so that the second object image is matched with a standard object image template.

9. The method according to claim 4, wherein before the performing a style transfer on the first object image with the second object image as a style reference template, the method further comprises:

performing a processing of shades eliminating on the first object image.

10. The method according to claim 4, wherein before the integrating the first object image subjected to the style transfer and the second object image in the second picture by fusion according to the pixel weight graph of the first object image, the method further comprises:

performing outline adjustment on the second object image according to the boundary of the first object image so that the second object image is matched with the first object image in outlines.

11. The method according to claim 4, wherein before the integrating the first object image subjected to the style transfer and the second object image in the second picture by fusion according to the pixel weight graph of the first object image, the method further comprises:

performing color conversion on the first object image subjected to the style transfer, so that a color distribution of the first object image is matched with a color distribution of the second object image.

12. The method according to claim 4, wherein the first object and the second object are the objects of the same kind, and the second object image contains one or more second internal feature points whose positions are matched with the positions of the first internal feature points.

13. An electronic apparatus, comprising:

a processing unit; and a memory, coupled to the processing unit and containing instructions stored thereon, the instructions cause the electronic apparatus to perform operations upon being executed by the processing unit, the operations comprise:

obtaining a first object image in a first picture and one or more internal feature points of the first object image to generate a pixel weight graph of the first object image, and in the pixel weight graph, the weights of the first internal feature points are higher than the weights of points other than the first internal feature points;

obtaining a second object image in a second picture, and performing a style transfer on the first object image with the second object image as a style reference template; and integrating the first object image subjected to the style transfer and the second object image in the second picture by fusion according to the pixel weight graph of the first object image, wherein the integrating the first object image subjected to style transfer and the second object image in the second picture by fusion according to the pixel weight graph of the first object image comprises:

performing fusion on pixels of the first object image and the second object image according to the weight corresponding to each point in the pixel weight graph, so that in each pixel subjected to fusion, the higher the weight of the pixel is, the closer the attribute value of the pixel is to the attribute value of the pixel of the first object image subjected to the style transfer, and the lower the weight of the pixel is, the closer the attribute value of the pixel is to the attribute value of the pixel of the second object image.

14. The method according to claim 13, wherein before the integrating the first object image subjected to style transfer and the second object image in the second picture by fusion according to the pixel weight graph of the first object image, the method further comprises:

obtaining one or more second internal feature points of the second object image; and performing an affine transformation on the first object image according to the first internal feature points and the second internal feature points, so that the first internal feature points of the first object image subjected to the affine transformation are aligned with the second internal feature points of the second object image.

15. The method according to claim 13, wherein before the performing a style transfer on the first object image with the second object image as a style reference template, the method further comprises:

performing correction on the first object image according to the first internal feature points or according to both the first internal feature points and the boundary of the first object image, so that the first object image is matched with a standard object image template.

16. The method according to claim 13, wherein before the performing a style transfer on the first object image with the second object image as a style reference template, the method further comprises:

obtaining second internal feature points of the second object image; and performing correction on the second object image according to the second internal feature points or according to both the second internal feature points and the boundary of the second object image, so that the second object image is matched with a standard object image template.

17. The method according to claim 13, wherein before the performing a style transfer on the first object image with the second object image as a style reference template, the method further comprises:

performing a processing of shades eliminating on the first object image.

18. The method according to claim 13, wherein before the integrating the first object image subjected to the style transfer and the second object image in the second picture by fusion according to the pixel weight graph of the first object image, the method further comprises:

performing outline adjustment on the second object image according to the boundary of the first object image so that the second object image is matched with the first object image in outlines.

* * * * *